(No Model.) 2 Sheets—Sheet 1.

T. O. BATEMAN.
SPEED INDICATOR.

No. 563,544. Patented July 7, 1896.

WITNESSES:
Edward C. Rowland
Theo. G. Hoster

INVENTOR
T. O. Bateman
BY Munn & Co.
ATTORNEYS.

(No Model.)  2 Sheets—Sheet 2.

T. O. BATEMAN.
SPEED INDICATOR.

No. 563,544. Patented July 7, 1896.

WITNESSES:
C. E. Holske
Geo. G. Hoster

INVENTOR
T. O. Bateman
BY Munn & Co.
ATTORNEYS.

UNITED STATES PATENT OFFICE.

TALBOT OWENS BATEMAN, OF FORT WORTH, TEXAS.

SPEED-INDICATOR.

SPECIFICATION forming part of Letters Patent No. 563,544, dated July 7, 1896.

Application filed July 20, 1895. Serial No. 556,597. (No model.)

*To all whom it may concern:*

Be it known that I, TALBOT OWENS BATEMAN, of Fort Worth, in the county of Tarrant and State of Texas, have invented a new and Improved Speed-Indicator, of which the following is a full, clear, and exact description.

The object of the invention is to provide a new and improved speed-indicator which is simple and durable in construction, and more especially designed for use on trolley-cars and other vehicles to at once and automatically indicate to the following car, to an officer of the law, or to any other person whether the car is running at a normal prescribed rate of speed or whether that speed is exceeded.

The invention consists principally of a governor controlled from the running part of the vehicle, and a device for actuating a normal signal, and an alarm or danger signal, the said device being controlled by the said governor.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1:
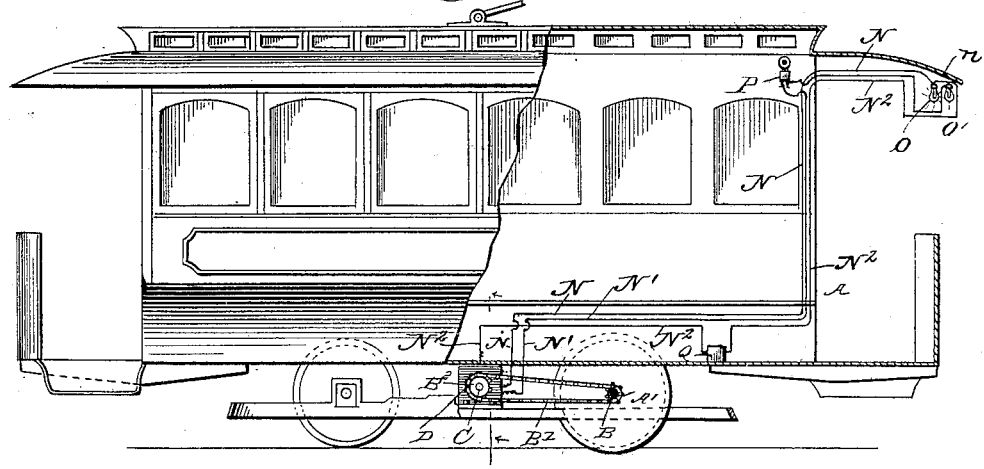
Figure 2:
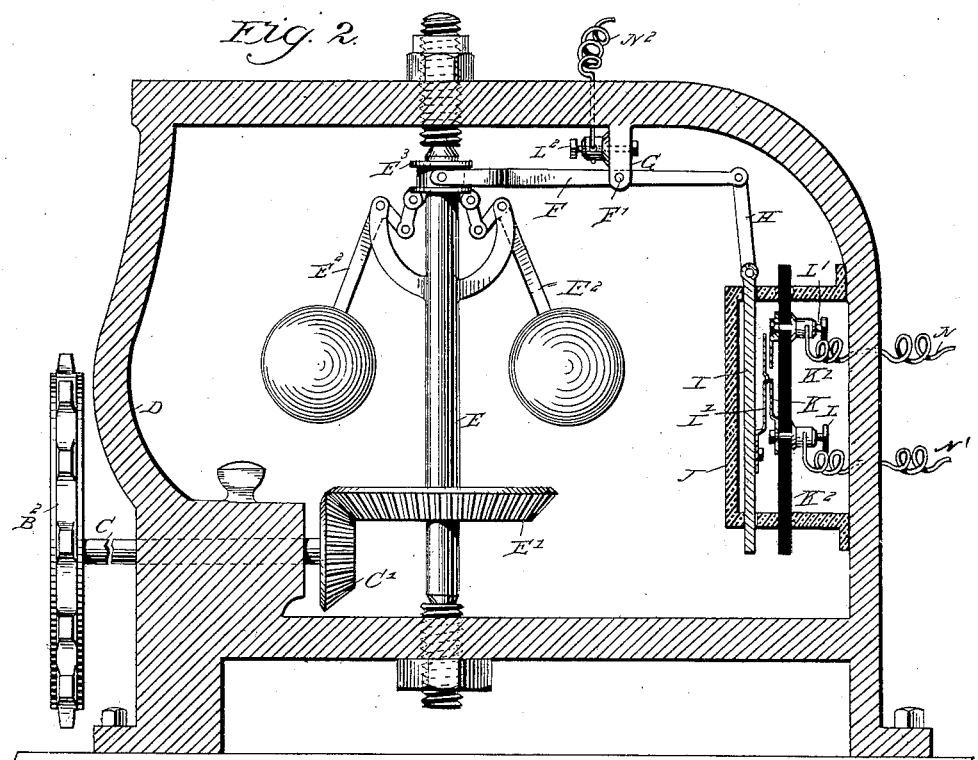
Figure 3:
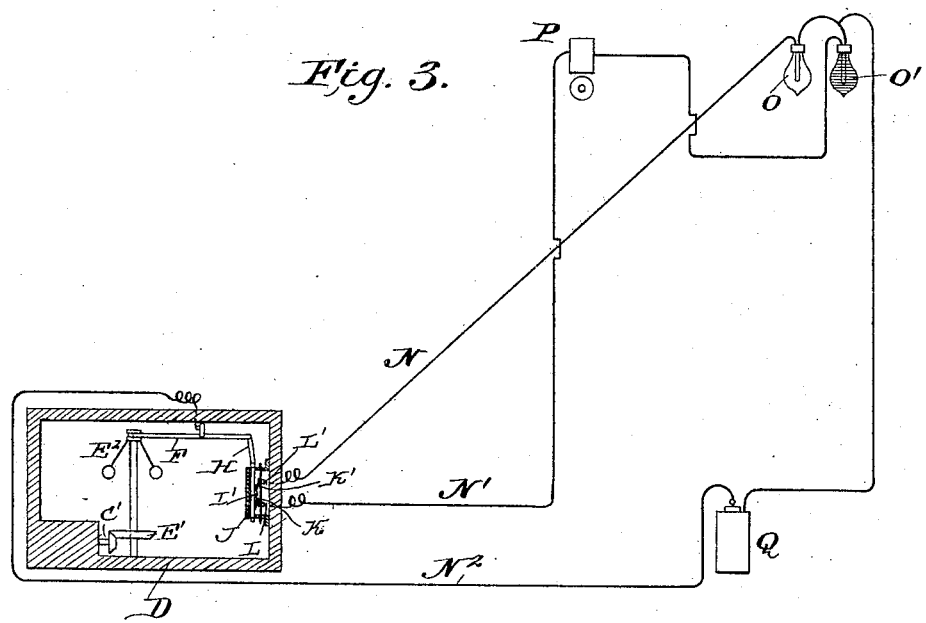

Figure 1 is a side elevation of the car with parts in section and with the improvement applied, and Fig. 2 is an enlarged transverse section of the improvement; and Fig. 3 is a diagram view showing the arrangement of wires, as hereinafter referred to.

The car A, on which the improvement is applied, is provided on one of its axles A' with a sprocket-wheel B, over which passes a sprocket-chain B', passing over a sprocket-wheel $B^2$, secured on the outer end of a shaft C, mounted to turn in suitable bearings in a casing D, preferably made of insulating material and supported on the truck of the car A. On the inner end of this shaft C is secured a beveled pinion C' in mesh with a beveled gear-wheel E', attached to the governor-shaft E, mounted to turn in suitable bearings in the casing D, as is plainly indicated in Fig. 2.

On brackets on the governor-shaft E are pivoted weighted governor-arms $E^2$, connected by links in the usual manner with a collar $E^3$, mounted to slide loosely on the shaft E, and connected with the forked end of a lever F, fulcrumed at F' on a bracket G, attached to the under side on the top of the casing D. The free end of the lever F is connected by a link H with a slide I, mounted to slide in suitable bearings in an insulated casing J, secured to the inside of the casing B.

The slide I is provided with a contact-plate I', adapted to make contact with either one of the contact-plates K and K', held on an insulated plate $K^2$, secured in the casing J, the said contact-plates K and K' being respectively connected with binding-posts L and L' in circuit with wires N and N', respectively. The plate I has connected thereto a wire $N^2$ through the medium of the lever F and link H; and this wire proceeds to the battery Q, with which it is in circuit, and thence connects with the wire N, which wire, having passed from the binding-post L, proceeds through the lamps O and O'. The wire N terminates at the lamp O' and the circuit in which said lamp is included continues through the wire N', in which is also included the alarm-bell P. The lamp O is to be provided with a white bulb and the lamp O' with a red bulb. It will thus be seen that as the plate I' makes contact with the point K', with which the wire N directly communicates, the current of electricity from the battery Q will pass through the wire N, the lamp O, and the wire $N^2$, the circuit being completed by the lever F and link H. When the conditions of the apparatus are such that the plate I' is shifted to make contact with the point K, the course of the current will be changed and the wire N will be cut out of circuit, so that the current from the battery Q will pass through the wire $N^2$, the lamp O', the wire N', and the alarm-bell P. Thus it will be seen that under one condition the lamp O will operate to the exclusion of the lamp O' and the bell P, and that under another condition the bell P and the lamp O' will operate to the exclusion of the lamp O.

Now it will be seen that when the car A is in motion, a rotary motion is transmitted from the axle A' to the shaft C by the sprocket-wheels B and $B^2$ and the chain B', and the rotary motion of the said shaft C is transmitted by the pinion C' and the beveled gear-wheel E' to the governor-shaft E. As the latter is rotated, the weighted governor-levers $E^2$ are actuated according to the speed of the shaft E, whereby a swinging motion is given to the lever F, so that the latter by the link H imparts a sliding motion to the slide I. Now as long as the car is running at a normal rate of speed, the plate I', attached to the slide I, does not move out of engagement with the plate K', but as soon as the car runs at a high rate of speed—that is, runs at a danger speed, or one above that prescribed by law—then the plate I' makes connection with the plate K and the lamp O is thrown out of circuit and the lamp O' and bell P thrown in, whereupon said lamp and bell will operate. When the excessive speed is relaxed, the governor-balls will fall and return the plate I', so as to reëstablish the current in the wires N and $N^2$, thereby excluding the lamp O' and the bell P and causing the lamp O to burn.

By the arrangement described an officer of the law or any other person can at a glance find out whether the car is running at or below the normal rate of speed prescribed by law, or whether the speed exceeds that prescribed by law. Furthermore, the motorman of the next following car or the conductor of the car ahead can see whether the car in question is running at an abnormal rate of speed, and consequently can take his precautions accordingly. It is understood that such lights or lamps O O', as well as the alarm P, can be arranged on either end of the car. Both such lamps, however, are shown only on one end of the car in the drawings.

The speed-indicator can be used upon a caboose, passenger-car, or locomotive, and by simple modifications of the switch will indicate accurately the rate of speed. Instead of using a battery, I may use a current from a trolley-wire. Five one-hundred-and-tenths volt lamps will give resistance enough, four lamps being inclosed in a small box under the car and two lamps over the motorman's head, only one of which will burn at a time.

The switch I shall use is preferably an ordinary three-way, so modified as to work from a lever.

Having thus fully described my invention, I claim as new and desire to secure by Letters Patent—

1. A speed-indicator for vehicles, comprising a casing, a governor mounted therein, gearing connecting the governor with a moving part of the vehicle, a lever mounted in the casing and connected to the governor, an insulated plate sustained in the casing, two contact-points on the plate, a contact-plate moving past the contact-points and actuated by the lever, signals, and electric connections, substantially as described.

2. In a speed-indicator for vehicles, a casing, a governor-spindle mounted therein, gearing connecting the spindle with a moving part of the vehicle, a lever mounted within the casing and connected to the governor, a second casing within the first casing, an insulating-plate sustained in the second casing, contact-points on the insulating-plate, a contact-plate movable in the casing and under the influence of the lever and capable of alternately engaging the contact-points, signals, and electrical connections, substantially as described.

TALBOT OWENS BATEMAN.

Witnesses:
K. DAN THOMPSON,
WILLIAM Q. BATEMAN.